(12) United States Patent
Kudo et al.

(10) Patent No.: US 12,182,978 B2
(45) Date of Patent: *Dec. 31, 2024

(54) PROJECTOR, IMAGE PROJECTION SYSTEM, AND METHOD FOR CONTROLLING PROJECTOR

(71) Applicant: SEIKO EPSON CORPORATION, Tokyo (JP)

(72) Inventors: Yusuke Kudo, Shiojiri (JP); Hirohiko Kihara, Matsumoto (JP); Hiroto Yomo, Shiojiri (JP); Takaaki Akie, Azumino (JP); Takaaki Ozawa, Shiojiri (JP); Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 17/835,119

(22) Filed: Jun. 8, 2022

(65) Prior Publication Data
US 2022/0301120 A1    Sep. 22, 2022

Related U.S. Application Data

(60) Division of application No. 17/193,657, filed on Mar. 5, 2021, now Pat. No. 11,393,080, which is a (Continued)

(30) Foreign Application Priority Data

Oct. 27, 2017 (JP) .................................. 2017-207921

(51) Int. Cl.
G06T 5/80      (2024.01)
G06T 11/60     (2006.01)
(Continued)

(52) U.S. Cl.
CPC ................ G06T 5/80 (2024.01); G06T 11/60 (2013.01); G09G 3/002 (2013.01);
(Continued)

(58) Field of Classification Search
None
See application file for complete search history.

(56) References Cited

U.S. PATENT DOCUMENTS 9,621,861 B2     4/2017  Hiranuma
2001/0021546 A1*  9/2001  Suwa ....................... G03F 1/84
                                                    430/311
(Continued)

FOREIGN PATENT DOCUMENTS

JP    2002-238064 A    8/2002
JP    2009-200613 A    9/2009
(Continued)

OTHER PUBLICATIONS

May 3, 2019 Office Action issued in U.S. Appl. No. 16/171,982.
(Continued)

Primary Examiner — James A Thompson
Assistant Examiner — Kim Thanh T Tran
(74) Attorney, Agent, or Firm — Oliff PLC

(57) ABSTRACT

A projector includes a projection section that projects a first image on a projection surface, a control section that causes the projection section to project a pattern image for installation including a first pattern that is located at an end of the first image, which overlaps with a second image, and a second pattern that is so disposed that a first straight line section is located in a position separate from the end by a distance, and a correction section that corrects the first image based on a captured image containing an image of a first area of the second image, and the first area is an area that overlaps with an area having a width corresponding to the distance
(Continued)

measured from the end of the first image in a state in which the first image and the second image overlap with each other.

13 Claims, 11 Drawing Sheets

Related U.S. Application Data continuation of application No. 16/171,982, filed on Oct. 26, 2018, now Pat. No. 11,062,431.

(51) Int. Cl.
    *G09G 3/00*     (2006.01)
    *G09G 3/36*     (2006.01)

(52) U.S. Cl.
    CPC ............... *G06T 2207/10024* (2013.01); *G06T 2207/30204* (2013.01); *G09G 3/36* (2013.01)

(56) References Cited

U.S. PATENT DOCUMENTS

| | | | |
|---|---|---|---|
| 2001/0022651 A1* | 9/2001 | Kubota | G03B 21/10 |
| | | | 353/122 |
| 2002/0027607 A1* | 3/2002 | Omura | G02B 7/28 |
| | | | 348/370 |
| 2006/0140488 A1* | 6/2006 | Yasunaga | H04N 1/4115 |
| | | | 375/E7.2 |
| 2006/0290890 A1 | 12/2006 | Saito et al. | |
| 2008/0143969 A1* | 6/2008 | Aufranc | G03B 21/26 |
| | | | 353/30 |
| 2009/0195764 A1* | 8/2009 | Takenaka | G03F 9/7088 |
| | | | 355/53 |
| 2011/0242494 A1 | 10/2011 | Imai et al. | |
| 2013/0278912 A1* | 10/2013 | Owa | G02B 26/06 |
| | | | 355/71 |
| 2013/0342816 A1 | 12/2013 | Furui | |
| 2014/0063192 A1* | 3/2014 | Sonoda | G01B 11/2513 |
| | | | 348/46 |
| 2014/0320658 A1* | 10/2014 | Pliefke | H04N 17/002 |
| | | | 348/148 |
| 2014/0362565 A1* | 12/2014 | Yao | H01L 25/0753 |
| | | | 362/223 |
| 2015/0015852 A1 | 1/2015 | Furui | |
| 2015/0138240 A1* | 5/2015 | Hiranuma | H04N 9/3194 |
| | | | 345/634 |
| 2018/0356213 A1 | 12/2018 | Zheng et al. | |
| 2019/0041785 A1* | 2/2019 | Tomii | G03G 15/5058 |

FOREIGN PATENT DOCUMENTS

| | | |
|---|---|---|
| JP | 2011-211276 A | 10/2011 |
| JP | 2015-60327 A | 3/2015 |
| JP | 2015-121779 A | 7/2015 |

OTHER PUBLICATIONS

Nov. 1, 2019 Office Action issued in U.S. Appl. No. 16/171,982.
Feb. 6, 2020 Office Action issued in U.S. Appl. No. 16/171,982.
Jul. 10, 2020 Office Action issued in U.S. Appl. No. 16/171,982.
Dec. 7, 2020 Office Action issued in U.S. Appl. No. 16/171,982.
Mar. 24, 2021 Notice of Allowance issued in U.S. Appl. No. 16/171,982.

* cited by examiner

PROJECTOR, IMAGE PROJECTION SYSTEM, AND METHOD FOR CONTROLLING PROJECTOR

CROSS-REFERENCE

This application is a Division of U.S. Ser. No. 17/193,657, filed Mar. 5, 2021, which is a Continuation of U.S. Ser. No. 16/171,982, filed Oct. 26, 2018. The entire disclosure of Japanese Patent Application No. 2017-207921, filed Oct. 27, 2017 is expressly incorporated by reference herein.

BACKGROUND

1. Technical Field

The present invention relates to a projector that projects an image, an image projection system, and a method for controlling the projector.

2. Related Art

In a system in which a plurality of projectors project a plurality of images next to each other to display a single large image, to display the images with seamless joints therebetween, it has been proposed to provide an overlapping area where the images partially overlap with each other (see JP-A-2002-238064, for example). In the system, for example, a camera captures an image of the images on the screen, and the shapes of the images are corrected and the luminance of the overlapping area is corrected based on the captured image.

In the correction of the images based on the image captured with the camera, however, an insufficient size of the overlapping area causes inappropriate correction, resulting in discontinuation of the correction process and unintended correction (resulting in extremely small overall screen, for example) in some cases. It is therefore necessary to provide an overlapping area having at least a certain size, but it is not easy for a user to determine an image overlapping area large enough for appropriate correction when the projectors are installed. As a result, the user recognizes that the overlapping area is insufficient only after the user installs the projectors and starts the correction process in many cases. Effort and time have therefore been required to install the projectors.

SUMMARY

An advantage of some aspects of the invention is to solve at least a part of the problems described above, and the invention can be implemented as the following forms or application examples.

Application Example 1

A projector according to this application example includes a projection section that projects a first image on a projection surface, a control section that causes the projection section to project, as the first image, a pattern image including a first pattern that is located at an end of the first image, which overlaps with a second image projected by another projector, and a second pattern that is so disposed as to be partially located in a position separate from the end by at least a first distance and differs from the first pattern in terms of color, and a correction section that corrects the first image based on a captured image containing an image of at least a first area of the second image, and the first area is an area that overlaps with an area having a width corresponding to the first distance measured from the end of the first image in a state in which the first image and the second image overlap with each other.

According to the projector, the first pattern is projected at an end of the first image, and the second pattern, which differs from the first pattern in terms of color, is so projected as to be partially located in a position separate from the end by at least the first distance, whereby a user can grasp how much the first image should overlap with the second image when the user installs the projector. As a result, installation effort and time resulting from discontinuation of correction that follows the installation of the projectors and occurrence of unintended correction can be reduced.

Application Example 2

In the projector according to the application example described above, it is desirable that the first pattern is a linear pattern disposed along the end of the first image.

According to the projector, since the first pattern, which is a linear pattern, is disposed along the end of the first image, the user can readily grasp the end of the first image when the user installs the projector.

Application Example 3

In the projector according to the application example described above, it is desirable that the second pattern has a straight line parallel to the end and located in a position separate from the end of the first image by at least the first distance.

According to the projector, the second pattern has a straight line parallel to the end and located in a position separate from the end of the first image by at least the first distance, whereby the user can readily grasp how much the first image should overlap with the second image.

Application Example 4

In the projector according to the application example described above, it is desirable that the second pattern includes a straight line extending in a direction in which the first image and the second image are arranged.

According to the projector, the second pattern includes a straight line extending in the direction in which the first image and the second image are arranged, whereby the user readily distinguish the second pattern from the first pattern.

Application Example 5

It is desirable that the projector according to the application example described above further includes a distance acquisition section that acquires information on the first distance and an image generation section that generates the pattern image based on the information acquired by the distance acquisition section.

According to the projector, the pattern image is generated based on the information acquired by the distance acquisition section, whereby a pattern image corresponding to a desired first distance can be projected.

Application Example 6

In the projector according to the application example described above, the second pattern may be so disposed by the image generation section as to be partially located in a position separate from the end by a distance longer than the first distance and based on the information acquired by the distance acquisition section.

According to the projector, the second pattern is so disposed as to be partially located in a position separate from the end by a distance longer than the first distance, whereby the first image and the second image are allowed to overlap with each other with a margin.

Application Example 7

It is desirable that the projector according to the application example described above further includes a position acquisition section that acquires information on a positional relationship between the first image and the second image and an image generation section that generates the pattern image based on the information acquired by the position acquisition section.

According to the projector, the pattern image is generated based on the information acquired by the position acquisition section, a pattern image suitable for the positional relationship between the first and second images can be projected.

Application Example 8

An image projection system according to this application example is an image projection system including a first projector that projects a first image on a projection surface and a second projector that projects a second image on the projection surface in such a way that part of the second image overlaps with the first image. The first projector includes a projection section that projects the first image, a control section that causes the projection section to project, as the first image, a pattern image including a first pattern that is located at an end of the first image, which overlaps with the second image, and a second pattern that is so disposed as to be partially located in a position separate from the end by at least a first distance and differs from the first pattern in terms of color, and a correction section that corrects the first image based on a captured image containing an image of at least a first area of the second image, and the first area is an area that overlaps with an area having a width corresponding to the first distance measured from the end of the first image in a state in which the first image and the second image overlap with each other.

According to the image projection system, the first pattern is projected at an end of the first image, and the second pattern, which differs from the first pattern in terms of color, is so projected as to be partially located in a position separate from the end by at least the first distance, whereby a user can grasp how much the first image should overlap with the second image when the user installs the projectors. As a result, installation effort and time resulting from discontinuation of correction that follows the installation of the projectors and occurrence of unintended correction can be reduced.

Application Example 9

A method for controlling a projector according to this application example is a method for controlling a projector that projects a first image on a projection surface, the method including projecting, as the first image, a pattern image including a first pattern that is located at an end of the first image, which overlaps with a second image projected by another projector, and a second pattern that is so disposed as to be partially located in a position separate from the end by at least a first distance and differs from the first pattern in terms of color, and correcting the first image based on a captured image containing an image of at least a first area of the second image, and the first area is an area that overlaps with an area having a width corresponding to the first distance measured from the end of the first image in a state in which the first image and the second image overlap with each other.

According to the method for controlling a projector, the first pattern is projected at an end of the first image, and the second pattern, which differs from the first pattern in terms of color, is so projected as to be partially located in a position separate from the end by at least the first distance, whereby a user can grasp how much the first image should overlap with the second image when the user installs the projector. As a result, installation effort and time resulting from discontinuation of correction that follows the installation of the projector and occurrence of unintended correction can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

An image projection system according to an embodiment of the invention will be described below with reference to the drawings.

Figure 1:
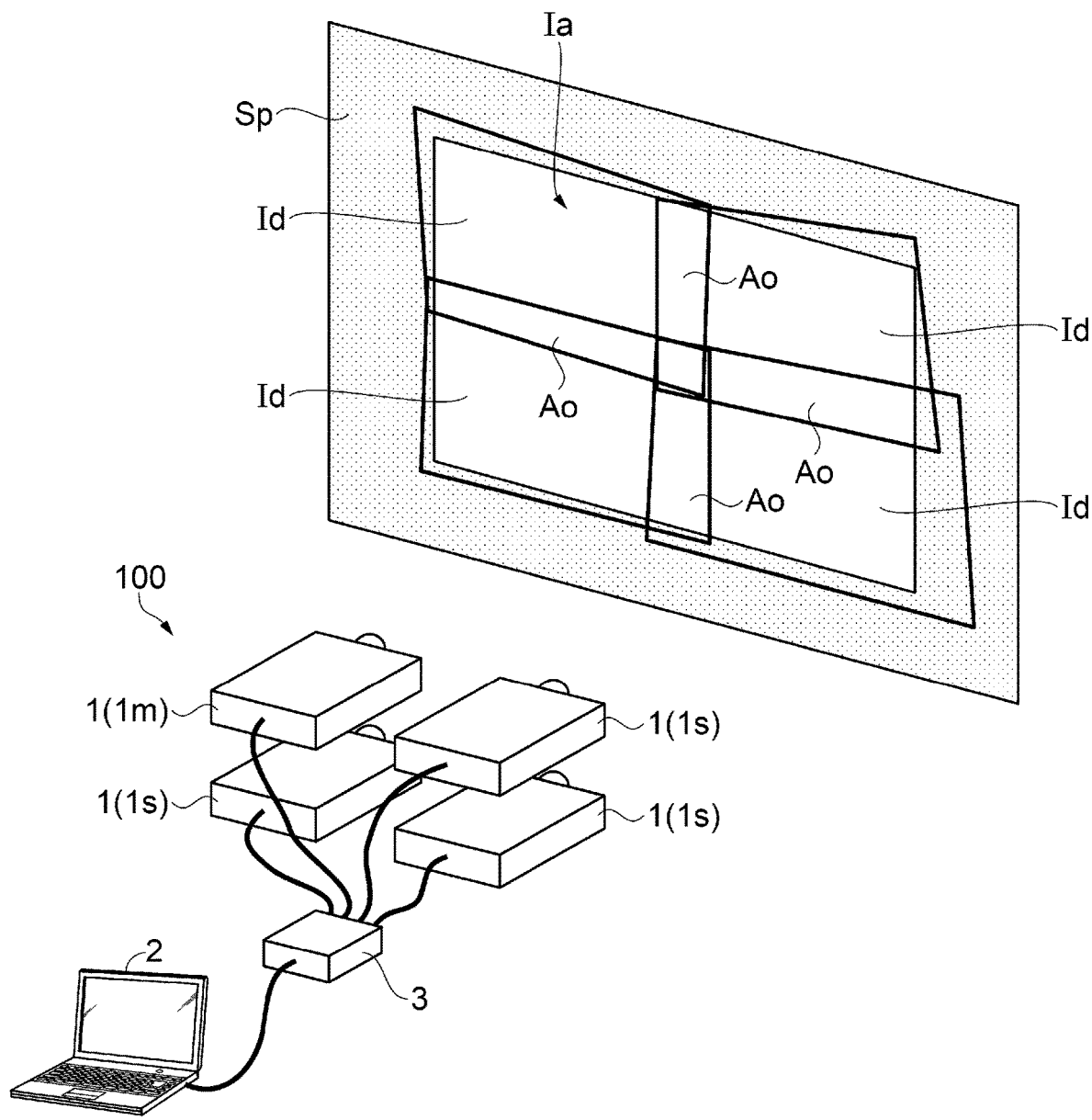
FIG. 1 is a descriptive diagram showing an image projection system.

FIG. 1 is a descriptive diagram showing an image projection system 100 according to the present embodiment.

The image projection system 100 includes four projectors 1, which project images on a projection surface Sp, such as a screen and a wall surface, and a computer 2, as shown in FIG. 1. The computer 2 is connected to the projectors 1 via a hub 3 and can control the action of each of the projectors 1. The four projectors 1 are so installed that images projected by the projectors 1 (hereinafter also referred to as "sub-images Id") are arranged next to each other and the four projectors 1 can therefore cooperate with one another to display a single large image (projection image Ia). The projectors 1 are also so installed that part of the sub-image Id projected by a projector 1 overlaps with part of the sub-image Id projected by another projector 1. The sub-images Id can therefore be seamlessly linked to each other with no gap therebetween. Causing the plurality of projectors 1 to cooperate with one another to display the single projection image Ia is also hereinafter referred to as "multi-projection," and an area Ao, where sub-images Id overlap with each other, is also referred to as an "overlapping area Ao."

One of the four projectors 1 (the projector 1 that projects the upper left sub-image Id in the present embodiment) is a master projector 1m, and the other three projectors 1 are each a slave projector 1s. The master projector 1m and the slave projectors 1s are connected to each other via the hub 3, and the master projector 1m can control the action of each of the slave projectors 1s.

The configuration of the image projection system 100 shown in FIG. 1 is a configuration required when the projectors 1 undergo initial settings. Thereafter, to display a desired content image as the projection image Ia, an external image supplying apparatus 4 (see FIG. 2) is connected to the projectors 1, and the image supplying apparatus 4 supplies image information corresponding to the content image.

Figure 2:
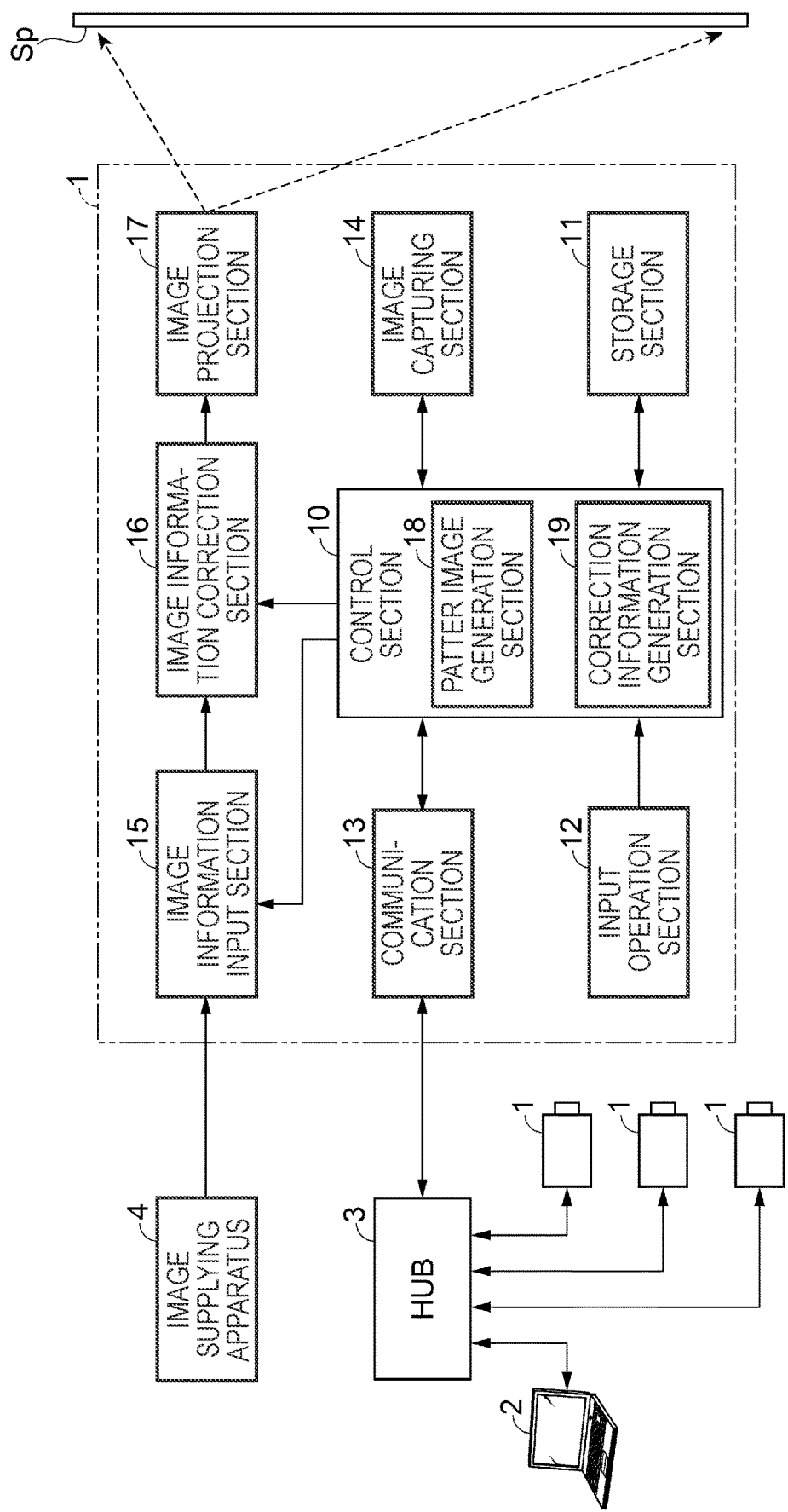
FIG. 2 is a block diagram showing a schematic configuration of each projector.
Figure 3:
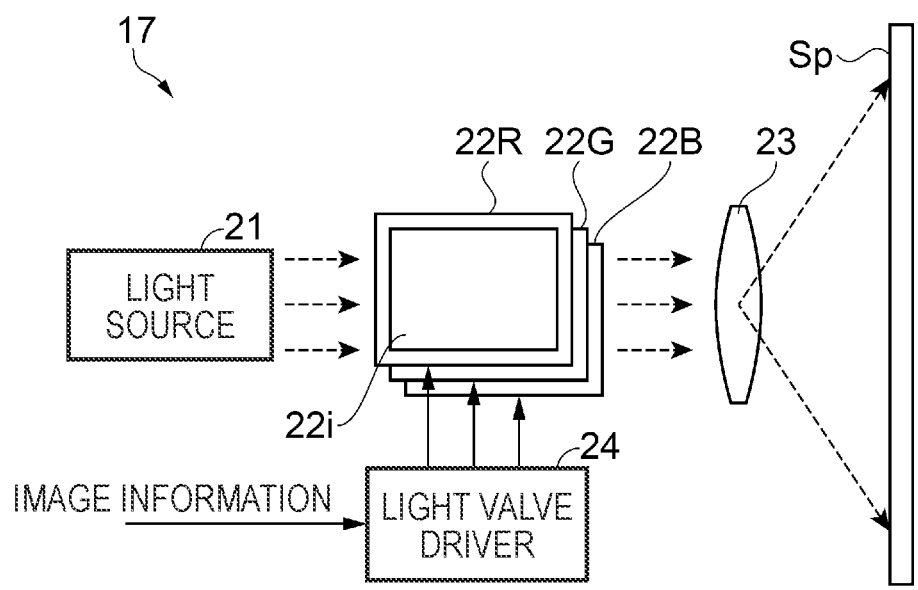
FIG. 3 is a block diagram showing a schematic configuration of an image projection section provided in each of the projectors.

FIG. 2 is a block diagram showing a schematic configuration of each of the projectors 1, and FIG. 3 is a block diagram showing a schematic configuration of an image projection section 17 provided in each of the projectors 1.

The projectors 1 each include a control section 10, a storage section 11, an input operation section 12, a communication section 13, an imaging section 14, an image information input section 15, an image information correction section 16 as a correction section, and the image projection section 17 as a projection section, with the sections described above integrated with one another, as shown in FIG. 2. The projectors 1 each project an image on the projection surface Sp via the image projection section 17 based on image information inputted to the image information input section 15.

The control section 10 is formed of one or more processors and operates in accordance with a control program stored in the storage section 11 to oversee and control the action of the projector 1.

The storage section 11 is formed of a random access memory (RAM), a read only memory (ROM), and other memories. The RAM is used to temporarily store a variety of data and other pieces of information, and the ROM stores the control program, control data, and other pieces of information for controlling the action of the projector 1. The storage section 11 further stores, for example, image information on a pattern image (pattern image for correction) to be projected via the image projection section 17 for correction of the sub-image Id.

The input operation section 12 includes a plurality of operation keys that allow a user to issue a variety of instructions to the projector 1. When the user operates any of the variety of operation keys on the input operation section 12, the input operation section 12 outputs an operation signal according to the content of the user's operation to the control section 10. A remote control (not shown) that allows the user to remotely operate the projector 1 may be used as the input operation section 12. In this case, the remote control issues an infrared operation signal according to the content of the user's operation, and a remote control signal receiver that is not shown receives the infrared operation signal and transmits the signal to the control section 10.

The communication section 13 is connected to external apparatus, such as the computer 2 and the other projectors 1, via the hub 3 (network) and transmits and receives information to and from the external apparatus. The connection between the communication section 13 and the external apparatus is not limited to wired connection and may be wireless connection.

The imaging section 14 is a camera including a charge coupled device (CCD) sensor, a complementary metal oxide semiconductor (CMOS) sensor, or any other imaging device (not shown). The imaging section 14 captures an image of the projection surface Sp under the control of the control section 10 and outputs image information that is the result of the imaging (captured image information) to the control section 10. The imaging section 14 captures an image at least over the range where the image projection section 17 projects an image (sub-image Id). Therefore, in the case where the projectors 1 are so installed that the plurality of sub-images Id partially overlap with each other, as shown in FIG. 1, the imaging section 14 can also capture an image of part of the adjacent sub-image Id, specifically, at least an area contained in the overlapping area Ao.

The image information input section 15 is connected to the external image supplying apparatus 4, such as an image reproducing apparatus, and receives image information supplied from the image supplying apparatus 4 and corresponding to a content image. The image information input section 15 can further receive the image information stored in the storage section 11 via the controller 10 and image information generated by the control section 10 therefrom. The image information input section 15 outputs the inputted image information to the image information correction section 16.

The image information correction section 16 corrects the image information inputted from the image information input section 15 and outputs the processed image information to a light valve driver 24 (see FIG. 3) in the image projection section 17 under the control of the control section 10. For example, the image information correction section 16 performs correction of the shape of the sub-image Id, adjustment of the brightness of the overlapping area Ao, and other types of processing on the image information as required.

The image information input section 15 and the image information correction section 16 may each be formed of one or more processors and other components or may be formed of a dedicated processing device, such as an application specific integrated circuit (ASIC) and a field programmable gate array (FPGA).

The image projection section 17 includes a light source 21, three liquid crystal light valves 22R, 22G, and 22B as light modulators, a projection system 23, a light valve driver 24, and other components, as shown in FIG. 3. In the image projection section 17, the liquid crystal light valves 22R, 22G, and 22B modulate light emitted from the light source 21 to form image light, and the projection system 23 including at least one of a lens and a mirror projects the image light to display an image on the projection surface Sp.

The light source 21 is formed of a discharge-type light source lamp, such as an ultrahigh-pressure mercury lamp and a metal halide lamp, or a solid-state light source, such as a light emitting diode and a semiconductor laser. The light emitted from the light source 21 is converted by an optical integration system that is not shown into light having a roughly uniform luminance distribution, which is separated by a color separation system that is not shown into color light components of red (R), green (G), and blue (B), which are the three primary colors of light, and the RGB color light components are then incident on the liquid crystal light valves 22R, 22G, and 22B, respectively.

The liquid crystal light valves 22R, 22G, and 22B are each formed, for example, of a transmissive liquid crystal panel in which a pair of transparent substrates encapsulate a liquid crystal material. The liquid crystal panels each have a rectangular pixel area 22i, which is formed of a plurality of pixels arranged in a matrix, and drive voltage is applicable to the liquid crystal material on a pixel basis. The liquid crystal panels in the present embodiment comply with the wide ultra-extended graphics array (WUXGA), and the pixel area 22i contains 1920×1200 pixels.

The light valve driver 24 forms an image in the pixel area 22i of each of the liquid crystal light valves 22R, 22G, and 22B. Specifically, the light valve driver 24 applies drive voltage according to the image information inputted from the image information correction section 16 to each of the pixels in the pixel areas 22i to cause the pixel to have light transmittance according to the image information. The light emitted from the light source 21 passes through the image area 22i of each of the liquid crystal light valves 22R, 22G, and 22B, which modulate the light on a pixel basis, so that image light according to the image information is formed on a color light basis. The thus formed color image light fluxes are combined with one another on a pixel basis by a light combining system that is not shown into image light representing a color image, which is enlarged and projected by the projection system 23 on the projection surface Sp. As a result, an image based on the image information inputted from the image information input section 15 (input image) is displayed on the projection surface Sp.

Referring back to FIG. 2, the control section 10 has, as functional blocks achieved by the control program, a pattern image generation section 18, which serves as an image generation section, and a correction information generation section 19.

The pattern image generation section 18 generates image information on a pattern image Ie for installation (see FIGS. 5A to 5D), which is projected when the projectors 1 are installed. The pattern image generation section 18 outputs the generated image information to the image information input section 15 when the projectors 1 are installed and causes the image projection section 17 to project the pattern image Ie for installation. The pattern image generation section 18, when it outputs the generated image information to the image information input section 15, instructs the image information correction section 16 not to correct the image information. The image projection section 17 therefore projects the non-corrected pattern image Ie for installation. The pattern image Ie for installation will be described later in detail.

The correction information generation section 19 generates correction information for correcting the shape and brightness of the sub-image Id based on the captured image information generated by the imaging section 14 when the multi-projection is performed. The correction information generation section 19 outputs the generated correction information to the image information correction section 16 and causes the image information correction section 16 to perform correction based on the correction information.

The action of the image projection system 100 will next be described.

Figure 4:
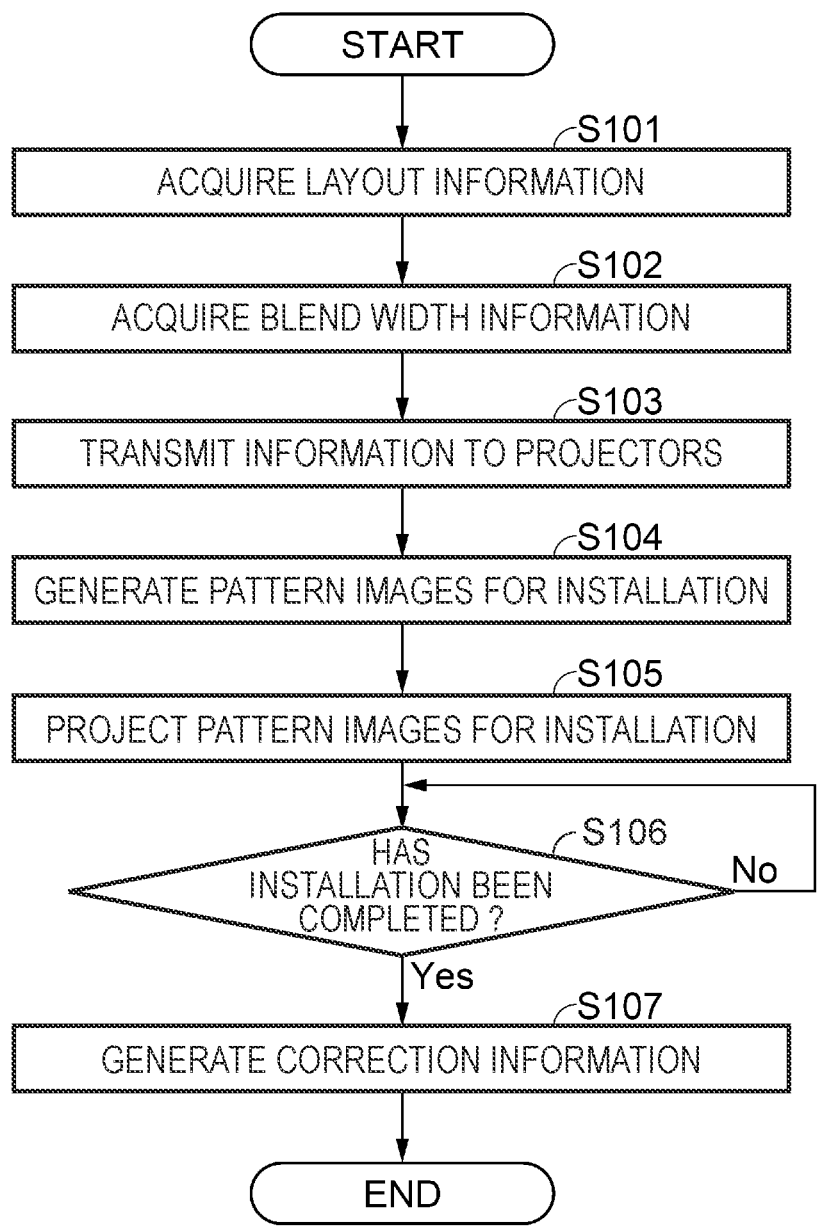
FIG. 4 is a flowchart for describing the action of the image projection system in initial settings of multi-projection.

FIG. 4 is a flowchart for describing the action of the image projection system 100 in the initial settings of the multi-projection.

When the user operates the computer 2 to start the initial settings of the multi-projection, the image projection system 100 operates in accordance with the flowchart shown in FIG. 4. In the following description, it is assumed that the four projectors 1 perform the multi-projection in the form of a 2×2 matrix, as shown in FIG. 1.

In step S101, the computer 2 acquires information on the layout of the sub-images Id (layout information) from the user, as shown in FIG. 4. Specifically, the computer 2 displays a list of the plurality of projectors 1 connected to the network and prompts the user to specify projectors 1 to be used out of the projectors 1 in the list, a layout (positional relationship) in accordance with which the sub-images Id are arranged, projectors 1 that project the sub-images Id and the positions where the sub-images Id are projected, a projector 1 that serves as the master projector 1m, and other factors.

In the subsequent step S102, the computer 2 acquires information on the width of each overlapping area Ao (hereinafter also referred to as "blend width") (blend width information) from the user. A narrow overlapping area Ao makes it difficult to seamlessly link sub-images Id to each other, and the resultant projection image Ia tends to be unnatural. On the other hand, a wide overlapping area Ao allows seamless linkage between sub-images Id but increases the number of wasted pixels, resulting in a narrow projection range and degradation in the image quality. The user specifies a desired blend width in consideration of the characteristics described above. The blend width is specified in pixels or percentage (%) as the ratio of the blend width to the entire image. The blend width of vertically disposed sub-images Id and the blend width of horizontally disposed sub-images Id may be set at different values, or a common blend width may be set in the two cases.

In step S103, the computer 2 transmits the layout information and the blend width information acquired from the user to the projectors 1.

In step S104, the communication section 13 of each of the projectors 1 receives (acquires) the layout information and the blend width information from the computer 2, and the pattern image generation section 18 of each of the projectors 1 generates image information on the pattern image Ie for installation based on the received information. Based on the received layout information, the projectors 1 generate pattern images Ie for installation that differ from one another in accordance with the positions where the projectors 1 project the sub-images Id.

Figure 5A:
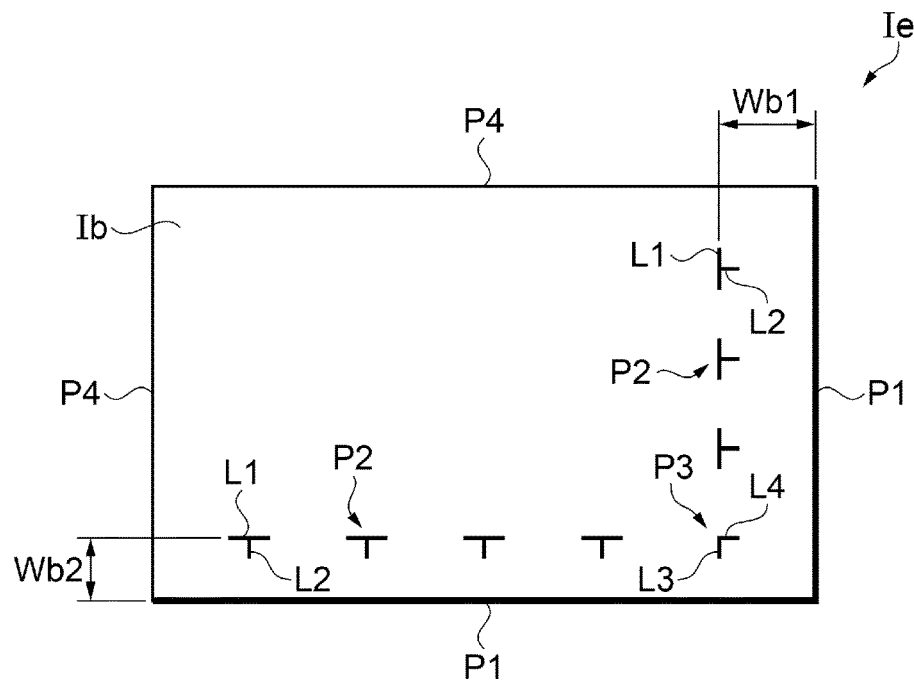
FIG. 5A shows a pattern image for installation generated by the projector that projects a sub-image in an upper left portion of a projection surface.
Figure 5B:
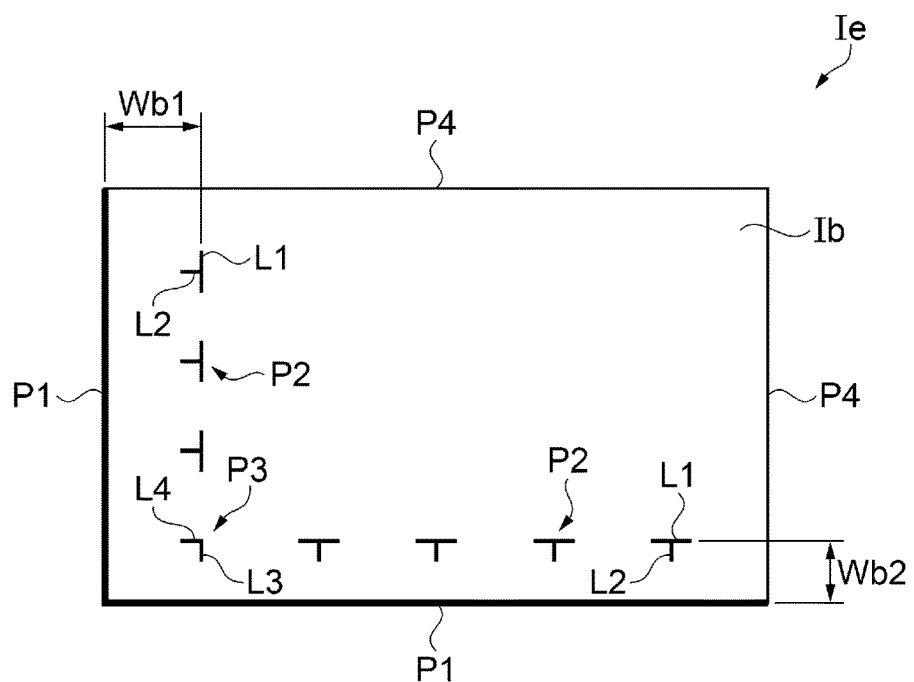
FIG. 5B shows a pattern image for installation generated by the projector that projects a sub-image in an upper right portion of the projection surface.
Figure 5C:
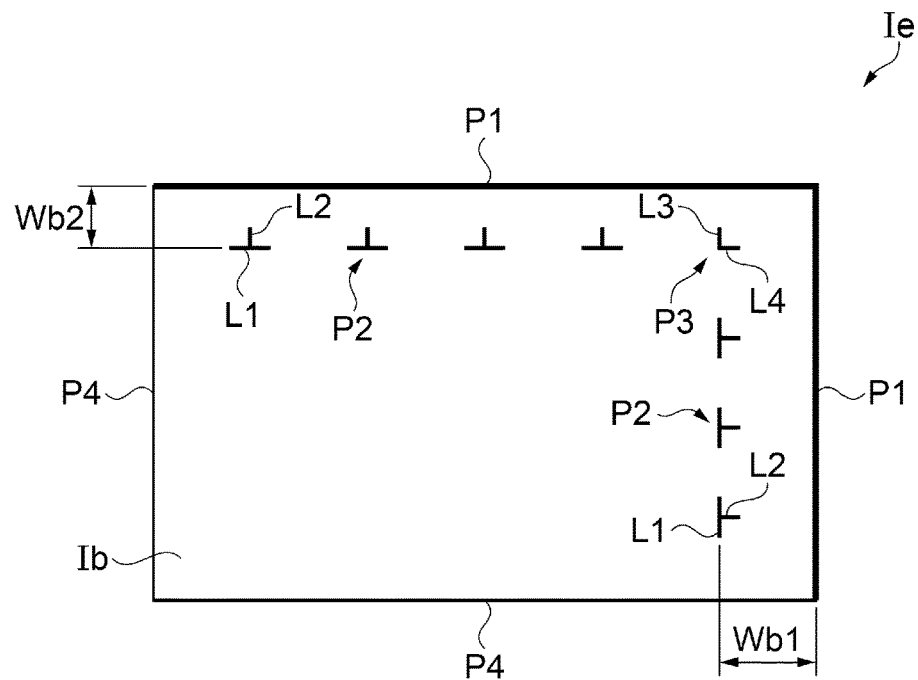
FIG. 5C shows a pattern image for installation generated by the projector that projects a sub-image in a lower left portion of the projection surface.
Figure 5D:
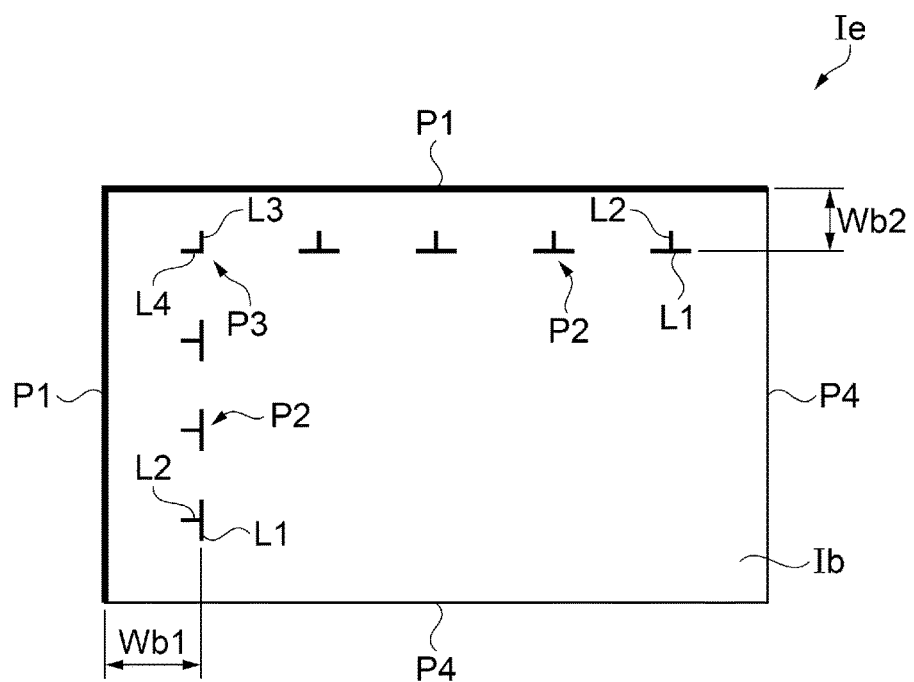
FIG. 5D shows a pattern image for installation generated by the projector that projects a sub-image in a lower right portion of the projection surface.

FIGS. 5A to 5D show the generated pattern images Ie for installation. FIG. 5A shows the pattern image Ie for installation generated by the projector 1 that projects the sub-image Id in an upper left portion of the projection surface Sp. FIG. 5B shows the pattern image Ie for installation generated by the projector 1 that projects the sub-image Id in an upper right portion of the projection surface Sp. FIG. 5C shows the pattern image Ie for installation generated by the projector 1 that projects the sub-image Id in a lower left portion of the projection surface Sp. FIG. 5D shows the pattern image Ie for installation generated by the projector 1 that projects the sub-image Id in a lower right portion of the projection surface Sp.

The pattern images Ie for installation are each an image formed across the entire pixel area 22i of each of the liquid crystal light valves 22R, 22G, and 22B and projected as the sub-image Id, and the pattern images Ie for installation each have a configuration in which linear first patterns P1, T-letter-shaped second patterns P2, an L-letter-shaped third pattern P3, linear fourth patterns P4 are arranged on a background image Ib. In the present embodiment, the background image Ib is a black plain image.

The first patterns P1 are disposed along part of four edges (ends) of the pattern image Ie for installation, specifically, edges that overlap with those of other sub-images Id. For example, in the pattern image Ie for installation generated by the projector 1 that projects the sub-image Id in the upper left portion of the projection surface Sp (see FIG. 5A), two first patterns P1 are disposed along the right and lower edges that overlap with edges of the sub-images Id projected by other projectors 1. In the present embodiment, the first patterns P1 are each a yellow straight line having a width corresponding to about three to six pixels and are so disposed as to be in contact with the edges.

The second patterns P2 are each a T-letter-shaped pattern so disposed as to face any of the first patterns P1. Specifically, the second patterns P2 each have a first straight line section L1, which is parallel to the first pattern P1 that faces the second pattern P2, and a second straight line section L2, which is perpendicular to the first pattern P1 that faces the second pattern P2. In the present embodiment, the first straight line section L1 and the second straight line section L2 are each a blue straight line having a width corresponding to about two to three pixels. The first straight line section L1 is so disposed as to be separate from the edge where the first pattern P1 that faces the second pattern P2 is disposed by a distance Wb1 or Wb2, which corresponds to the specified blend width. The second straight line section L2 extends from roughly the center of the first straight line section L1 by a predetermined distance in the direction toward the first pattern P1 that faces the second pattern P2, that is, in the direction in which the corresponding one of the overlapping other sub-images Id is disposed. In the present embodiment, three second patterns P2 are arranged along the short edge of the pattern image Ie for installation, and four second patterns P2 are arranged along the long edge thereof.

The third pattern P3 is an L-letter-shaped pattern displayed when the two first patterns P1 intersect each other to form a corner section, as in the present embodiment, and disposed in the vicinity of the corner section. Specifically, the third pattern P3 has a third straight line section L3, which is parallel to one of the first patterns P1 (the first pattern P1 on the short edge in the present embodiment), and a fourth straight line section L4, which is parallel to the other first pattern P1 (the first pattern P1 on the long edge in the present embodiment). In the present embodiment, the third straight line section L3 and the fourth straight line section L4 are each a red straight line having a width corresponding to about two to three pixels. The third straight line section L3 is so disposed as to be separate from the short edge where one of the first patterns P1 is disposed at least by the distance Wb1 corresponding to the specified blend width and extends from one end of the fourth straight line section L4 by a predetermined distance toward the first pattern P1 on the long edge. The fourth straight line section L4 is so disposed as to be separate from the long edge where the other first pattern P1 is disposed at least by the distance Wb2 corresponding to the specified blend width and extends from one end of the third straight line section L3 by a predetermined distance toward the first pattern P1 on the short edge.

The fourth patterns P4 are disposed along part of the four edges of the pattern image Ie for installation, specifically, edges that do not overlap with those of the other overlapping sub-images Id, that is, edges where no first pattern P1 is disposed. In the present embodiment, the fourth patterns P4 are each a white straight line having a width corresponding to one pixel and are so disposed as to be in contact with the edges.

Since the second patterns P2 and the third pattern P3 are disposed as described above, it can be said in other words that these patterns are each a pattern partially (first straight line section L1) located in a position separate from the end where either of the first patterns P1 is disposed by the distance Wb1 or Wb2, which corresponds to the specified blend width. It can also be said in other words that the second patterns P2 and the third pattern P3 are each a pattern disposed from a first position separate from the end where either of the first patterns P1 is disposed by the distance Wb1 or Wb2, which corresponds to the specified blend width, to a second position between the first position described above and the end described above.

Referring back to FIG. 4, having generated the image information on the pattern image Ie for installation, the image generation section 18 of each of the projectors 1 outputs the image information to the image information input section 15 and causes the image projection section 17 to project the pattern image Ie for installation in step S105.

Figure 6:
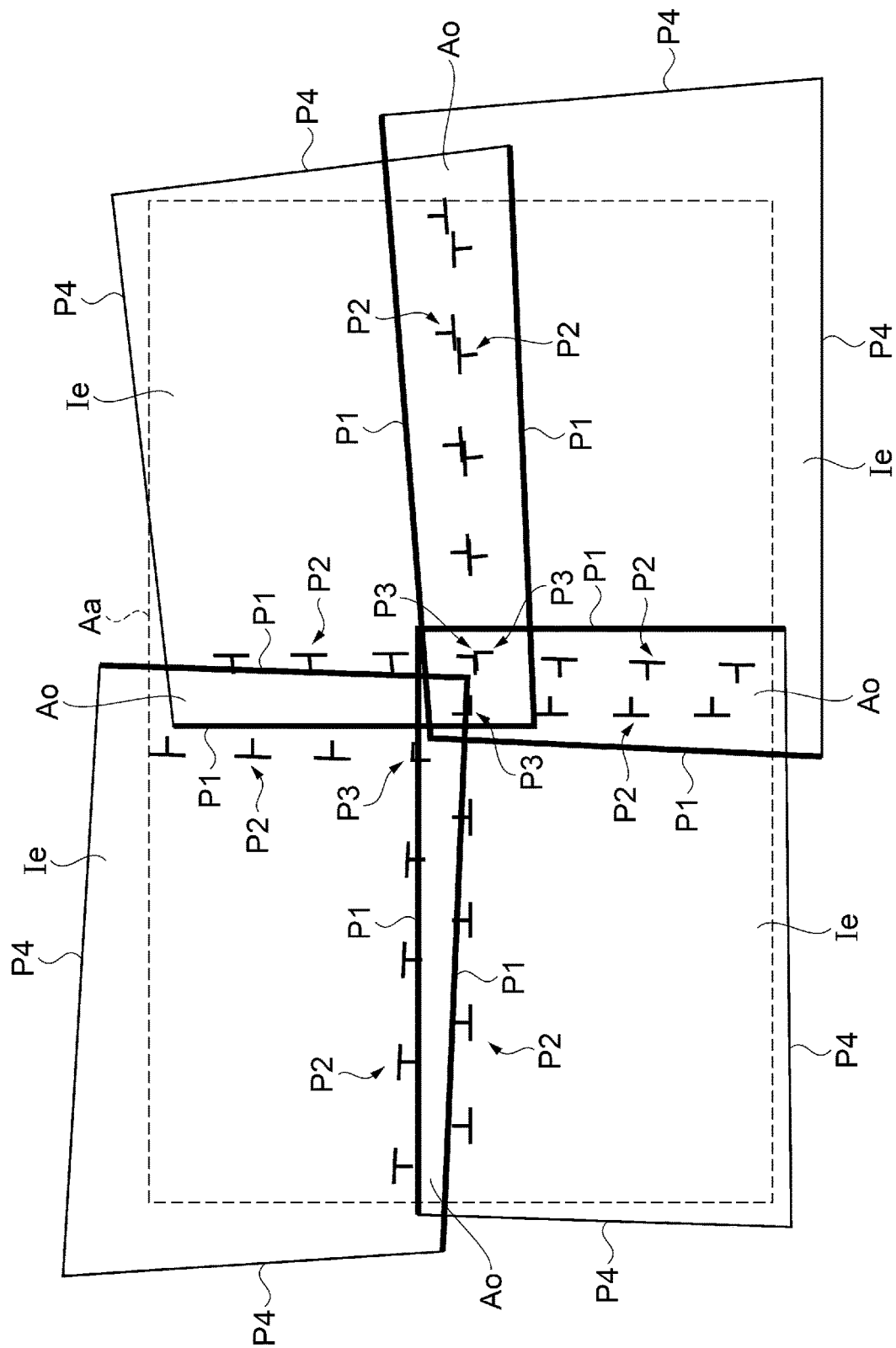
FIG. 6 shows a projection surface in a case where the projectors all project the pattern images for installation at the same time and shows an inappropriate installation state.
Figure 7:
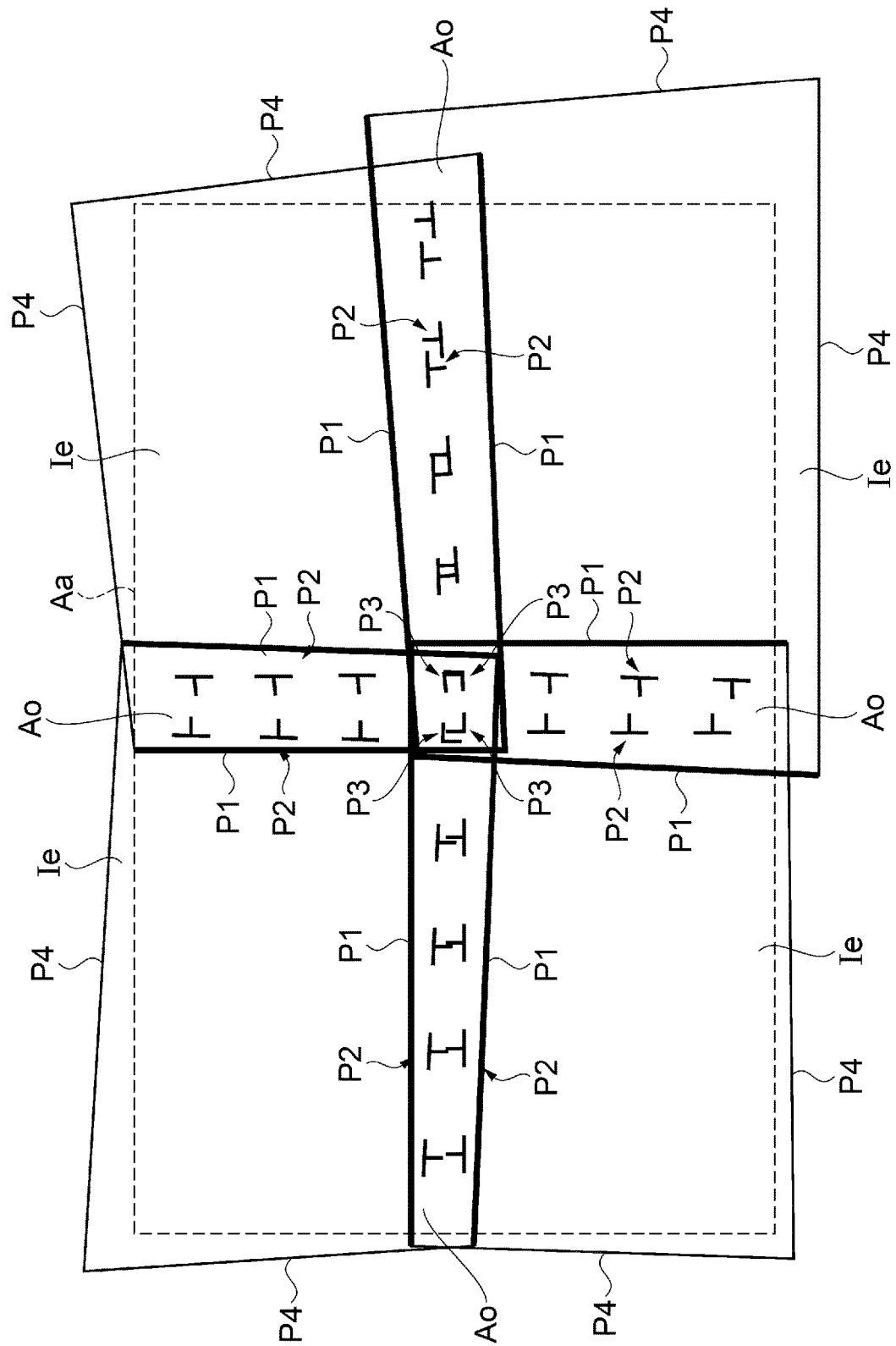
FIG. 7 shows the projection surface in the case where the projectors all project the pattern images for installation at the same time and shows an appropriate installation state.

FIGS. 6 and 7 show the projection surface Sp in a case where the projectors 1 all project the pattern images Ie for installation at the same time. FIG. 6 shows an inappropriate installation state, and FIG. 7 shows an appropriate installation state. Once the pattern images Ie for installation are projected on the projection surface Sp, the user can install the projectors 1 and make fine adjustment after the installation while referring to the projected pattern images Ie for installation.

When the user installs the projectors 1, the computer 2 shows a message displayed on the monitor of the computer 2 and stating that the pattern images Ie for installation need to satisfy the following three conditions.

(Condition 1) The entire projected range (range surrounded by white fourth patterns P4) covers a desired display range (range over which user desires to display projection image Ia) Aa of the projection surface Sp.

(Condition 2) The blue second patterns P2 fall within the area surrounded by the yellow first patterns P1.

(Condition 3) The red third patterns P3 fall within the central quadrangle surrounded by the yellow first patterns P1.

In a case where the condition 1 is not satisfied, the projection image Ia is undesirably projected over a range smaller than the desired range. In a case where neither the conditions 2 nor 3 is satisfied, the set blend width is not ensured. In this case, appropriate correction cannot be made.

The user therefore installs the projectors 1 with the three conditions satisfied. For example, in the case where the pattern images Ie for installation projected on the projection surface Sp are those shown in FIG. 6, none of the conditions is satisfied because part of the display range Aa is not covered with the images, and part of the second patterns P2 and the third patterns P3 is outside the range surrounded by the first patterns P1. In this case, the user needs to reinstall the projectors 1 appropriately. Once the user adjusts the installation of the projectors 1 with all the conditions satisfied, as shown in FIG. 7, the projectors 1 can project the projection image Ia across the desired display range Aa, and the sub-images Id overlap with each other with the overlapping width greater than the specified blend width, whereby the correction that follows the installation of the projectors 1 can be appropriately made.

Referring back to FIG. 4, in step S106, the computer 2 evaluates whether or not the installation of the projectors 1 has been completed. In a case where the user has performed operation representing that the installation of the projectors 1 has been completed, the computer 2 proceeds to the process in step S107, whereas in a case where the use has not performed the operation, the computer 2 repeats step S106.

When the user has performed the operation representing that the installation of the projectors 1 has been completed, and the process moves to step S107, the computer 2 notifies the master projector 1m of start of generation of the correction information. Having received the notification, the master projector 1m notifies the slave projectors is of the start of generation of the correction information.

When the generation of the correction information starts, the projectors 1 sequentially project a pattern image for correction for generating the correction information under the control of the master projector 1m. Specifically, the correction information generation section 19 in each of the projectors 1 reads the image information on the pattern image for correction stored in the storage section 11 and outputs the read image information to the image information input section 15. The correction information generation section 19 of one of the projectors 1 causes the imaging section 14 to capture the pattern image for correction projected by the image projection section 17 of the one projector 1 and further causes the imaging section 14 to capture the pattern image for correction projected by the projector 1 that projects the sub-image Id in the position adjacent to the sub-image Id projected by the one projector 1. The pattern image for correction can, for example, be an image having a plurality of dots arranged in a matrix.

As for the pattern image for correction projected by the projector 1 that projects the sub-image Id in the position adjacent to the sub-image Id projected by the one projector 1, the imaging section 14 captures at least an area contained in the overlapping area Ao, as described above. Therefore, in the state in which the projectors 1 are appropriately installed with the three conditions described above satisfied, the imaging section 14 captures not only the sub-image Id that is projected by the one projector 1 and forms the overlapping area Ao but at least an area extending from the end of the sub-image Id and having the specified blend width.

The correction information generation section 19 of each of the slave projectors is transmits captured image information generated by the imaging section 14 to the master projector 1m via the communication section 13. On the other hand, the correction information generation section 19 of the master projector 1m acquires the captured image information transmitted from the slave projectors is via the communication section 13 and grasps accurate arrangement of the sub-images Id and the positions of the overlapping areas Ao based on the captured image information generated by the imaging section 14 of the master projector 1m and the captured image information acquired from the slave projectors 1s. To display a rectangular projection image Ia, the correction information generation section 19 of the master projector 1m then sets an image formation area for forming the sub-image Id in the pixel area 22i of each of the projectors 1. The correction information generation section 19 transmits information representing the set image formation area (area information) to the slave projectors is via the communication section 13.

Once the image formation area for each of the projectors 1 has been determined, the correction information generation section 19 of each of the projectors 1 generates luminance information for setting the brightness of the overlapping area Ao in such a way that the brightness gradually decreases from an inner portion toward an outer portion (end of image formation area) of the overlapping area Ao so that the sub-images Id are seamlessly linked to each other in the overlapping area Ao and outputs the received area information and the generated luminance information as the correction information to the image information correction section 16 of the projector 1.

Thereafter, when image information according to the position of the sub-image Id is inputted from the image supplying apparatus 4 to the image information input section 15 of each of the projectors 1, the image information correction section 16 corrects the image information based on the correction information generated by the correction information generation section 19. As a result, the image projection section 17 of each of the projectors 1 projects an image based on the corrected image information, and the projection image Ia is projected on the projection surface Sp with the shape and brightness of the projection image Ia corrected.

As described above, the image projection system 100, the projectors 1, and the method for controlling the projectors 1 according to the present embodiment can provide the following advantages.

(1) According to the present embodiment, in each of the pattern images Ie for installation projected when the projectors 1 are installed, the first patterns P1 are disposed at ends of the pattern image Ie for installation, and the second patterns P2, which differ from the first patterns P1 in terms of color, are so disposed that the first straight line sections L1 are located in positions separate from the ends by the distance Wb1 or Wb2 corresponding to the specified blend width. The user can therefore grasp how much the sub-image Id projected by a projector 1 should overlap with the sub-image Id projected by another projector 1 when the user installs the projectors 1. As a result, installation effort and time resulting from discontinuation of the correction that follows the installation of the projectors 1 and occurrence of unintended correction can be reduced.

(2) According to the present embodiment, since the first patterns P1, which are each a linear pattern, are disposed along ends of each pattern image Ie for installation (sub-image Id), the user can readily grasp ends of the sub-images Id when the user installs the projectors 1.

(3) According to the present embodiment, the second patterns P2 have straight lines (first straight line sections L1) parallel to ends of each pattern image Ie for installation (sub-image Id) and located in positions separate from the ends by the distance Wb1 or Wb2 corresponding to the specified blend width, whereby the user can readily grasp how much the sub-images Id should overlap with each other.

(4) According to the present embodiment, the second patterns P2 each include a straight line (second straight line section L2) extending in the direction in which the overlapping sub-images Id are arranged, whereby the user readily distinguish the second patterns P2 from the first patterns P1.

(5) According to the present embodiment, the projectors 1 acquire the blend width information on the blend width specified by the user from the computer 2 and generate the pattern images Ie for installation based on the acquired blend width information, whereby pattern images Ie for installation corresponding to the specified blend width can be projected.

(6) According to the present embodiment, the projectors 1 acquire the layout information on the positional relationship among the sub-images Id from the computer 2 and generate, based on the acquired layout information, the pattern images Ie for installation according to the positions where the sub-images Id are projected. Pattern images Ie for installation suitable for the positional relationship among the sub-images Id can therefore be projected.

In the embodiment described above, the sub-image Id projected by the image projection section 17 of one of the projectors 1 corresponds to a first image. The sub-image Id projected by another projector 1 in such a way that the sub-image Id overlaps with the first image corresponds to a second image. Part of the second image or the area that overlaps with the first image corresponds to a first area. The first patterns P1 correspond to a first pattern. The second patterns P2 correspond to a second pattern. The distances Wb1 and Wb2 corresponding to the specified blend width correspond to a first distance. The communication section 13 that acquires the layout information from the computer 2 corresponds to a position acquisition section. The communication section 13 that acquires the blend width information from the computer 2 corresponds to a distance acquisition section.

Variations

The embodiment described above may be changed as follows.

Figure 8:
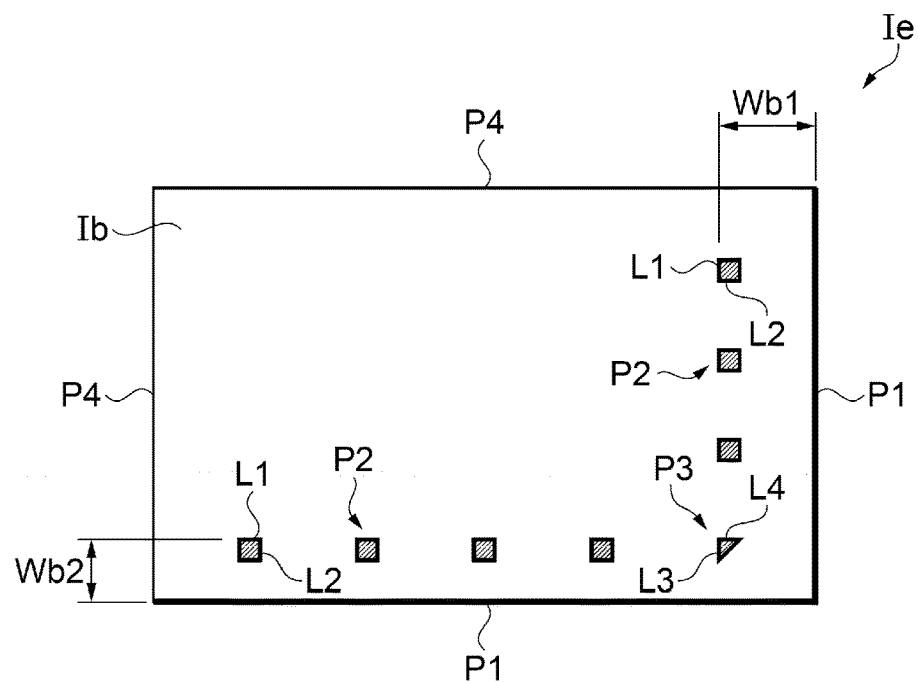
FIG. 8 shows a variation of the pattern image for installation.

In the embodiment described above, the color and form of each of the patterns contained in each pattern image Ie for installation are not limited to those described above and can be changed in a variety of manners. For example, the first patterns P1 or the fourth patterns P4 are not each limited to a solid straight line and may instead be a broken line, a dotted line, or a wavy line. The second patterns P2 or the third pattern P3 is not limited to the T-letter-shaped or L-letter-shaped pattern and may instead be a rectangular or triangular pattern (see FIG. 8) or a pattern having any other shape or a circular or star-shaped pattern or a pattern having any other shape (not shown). In the case where the second patterns P2 are each the rectangular pattern shown in FIG. 8, the second patterns P2 are each a pattern having first straight line sections L1, which are parallel to the first pattern P1 facing the second pattern P2, and second straight line sections L2, which are perpendicular to the first pattern P1 facing the second pattern P2, as in the case of the T-letter-shaped pattern. In the case where the third pattern P3 is the triangular pattern shown in FIG. 8, the third pattern P3 is a pattern having a third straight line section L3, which is parallel to one of the first patterns, and a fourth straight line section L4, which is parallel to the other first pattern, as in the case of the L-letter-shaped pattern.

Figure 9:
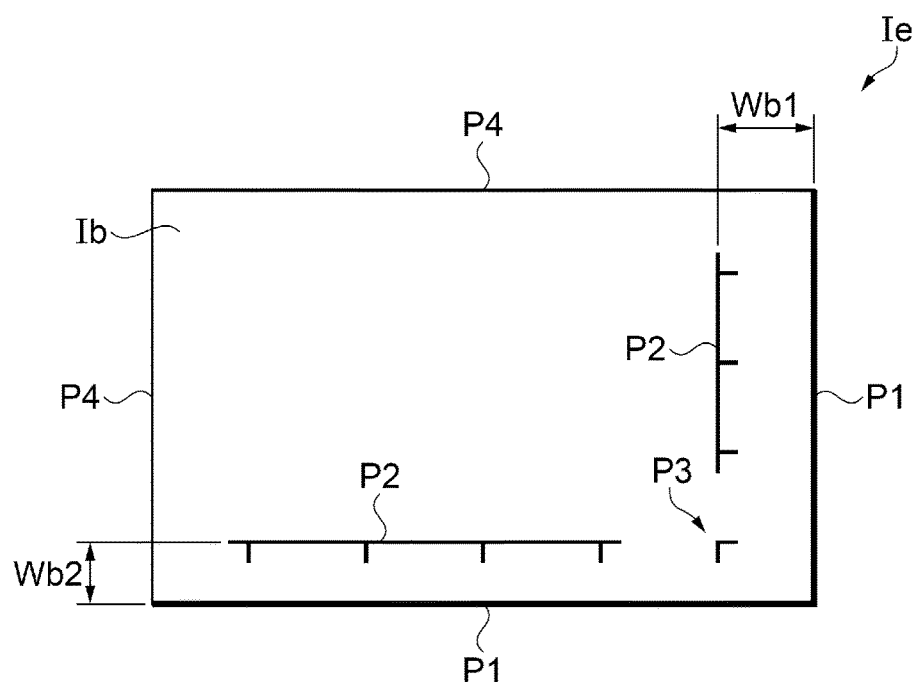
FIG. 9 shows another variation of the pattern image for installation.

In the embodiment described above, the second patterns P2 are formed of three second patterns P2 disposed along a short edge of each pattern image Ie for installation and four second patterns P2 disposed along a long edge thereof, but the number of second patterns P2 is not limited to those described above and may be determined as appropriate. Instead, a single large second pattern P2 formed of a plurality of patterns linked to each other may be disposed along each of the short and long edges, as shown in FIG. 9. It is, however, noted that the second patterns P2 are preferably formed of a plurality of divided patterns as in the embodiment described above because the thus shaped second patterns P2 are readily distinguished from the first patterns P1 in the pattern image Ie for installation projected by another projector 1.

In the embodiment described above, the linear first patterns P1 are so disposed as to be in contact with ends of each pattern image Ie for installation. The first patterns P1 may instead be disposed in positions separate from the ends by a predetermined distance. In this case, to satisfy the conditions 2 and 3 described above, the sub-images Id need to overlap with each other over a distance longer by an extra predetermined distance. However, since the predetermine distance serves as a margin, a specified blend width can be ensured even in a case where the condition 2 or 3 is not satisfied by a slight degree.

Similarly, the first straight line sections L1 of the second patterns P2 are disposed in positions separate from ends of each pattern image Ie for installation by the distance Wb1 or Wb2 corresponding to the blend width and may instead be disposed in positions separated from the ends not only the distance Wb1 or Wb2 corresponding to the blend width but an additional predetermined distance. Also in this case, since the predetermined distance serves as a margin, the specified blend width is readily ensured.

In the embodiment described above, the message stating that the three conditions need to be satisfied is displayed on the monitor of the computer 2, but not necessarily. For example, the message may instead be written in a setting manual or any other document that the user refers to when the user installs the projectors 1.

Figure 10A:
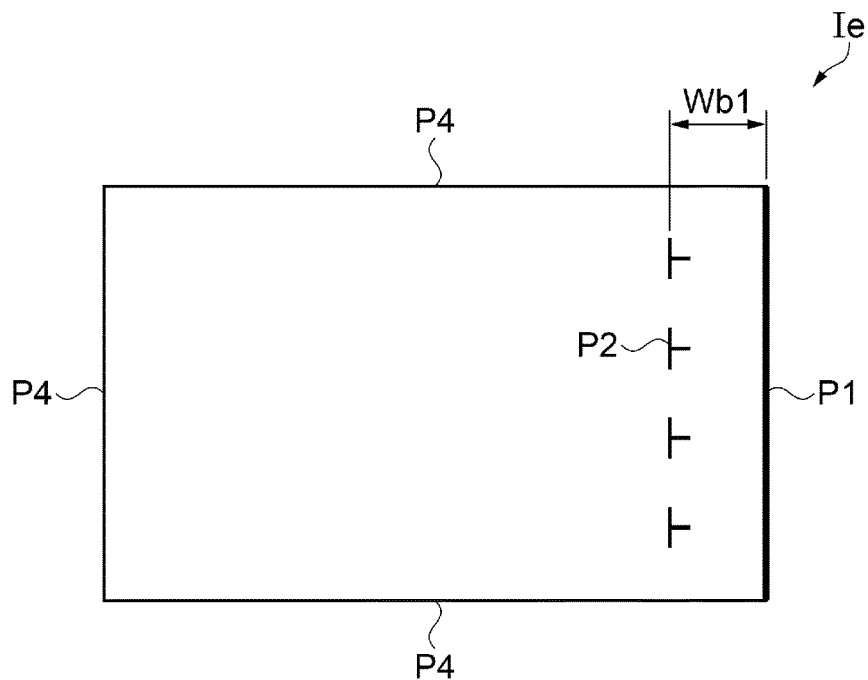
FIG. 10A shows a pattern image for installation generated by a projector that projects a sub-image at the left end of the projection surface.
Figure 10B:
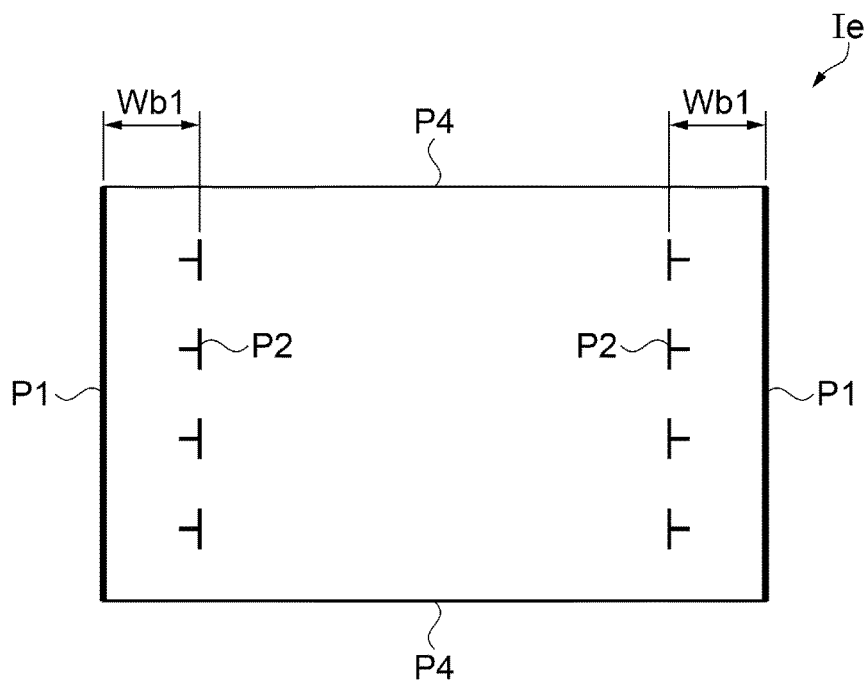
FIG. 10B shows a pattern image for installation generated by a projector that projects the sub-image in a position other than the right and left ends of the projection surface.
Figure 10C:
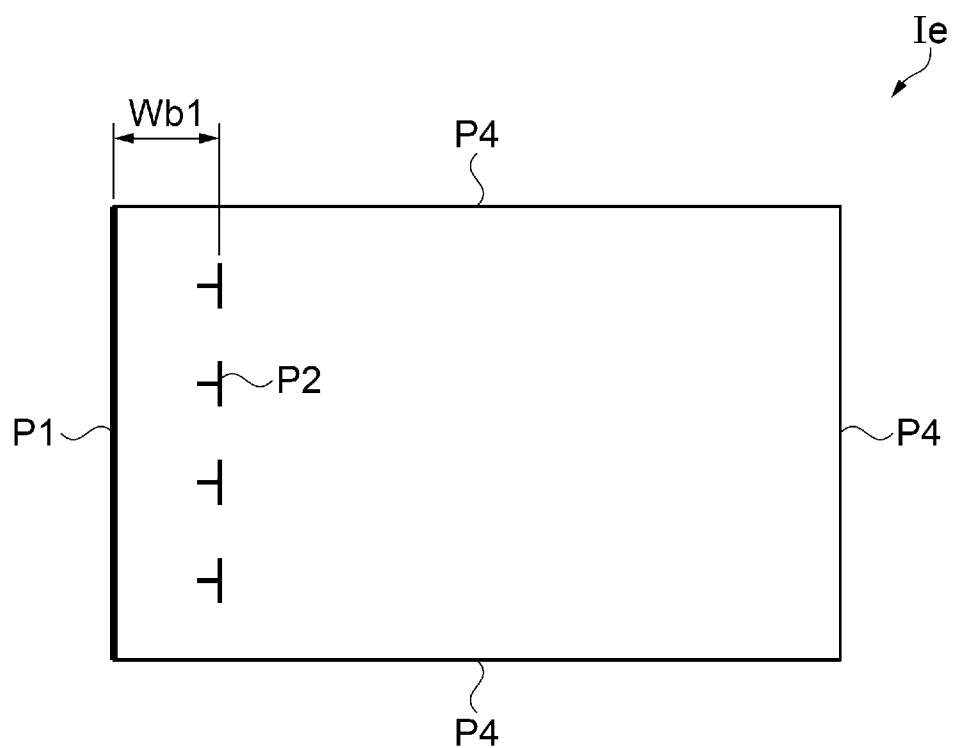
FIG. 10C shows a pattern image for installation generated by a projector that projects a sub-image at the right end of the projection surface.

In the embodiment described above, the case where the sub-images Id from the four projectors 1 are arranged in the 2×2 matrix has been presented by way of example, but the number and arrangement of the projectors 1 are not limited to those described above. For example, a plurality of sub-images Id may be arranged in a single vertical or horizontal row. To arrange the plurality of sub-images Id in a single horizontal row, the projectors 1 may project the pattern images Ie for installation shown, for example, in FIGS. 10A to 10C. FIG. 10A shows a pattern image Ie for installation generated by the projector 1 that projects a sub-image Id at the left end of the projection surface Sp. FIG. 10B shows a pattern image Ie for installation generated by the projector 1 that projects a sub-image Id in a position other than the right and left ends of the projection surface Sp. FIG. 10C shows a pattern image Ie for installation generated by the projector 1 that projects a sub-image Id at the right end of the projection surface Sp.

In the embodiment described above, the projectors 1 each include the imaging section 14, and the imaging section 14 captures the pattern image for correction to generate the correction information, but the image projection system 100 does not necessarily have the configuration described above. For example, an imaging apparatus independent of the projectors 1 is so disposed as to be capable of capturing all the sub-images Id at the same time, and the correction information may be generated based on the captured image generated by the imaging apparatus.

In the embodiment described above, the correction information generation section 19 of each of the projectors 1 generates the correction information. Instead, the computer 2 may generate the correction information and transmit the generated correction information to each of the projectors 1. On the other hand, the computer 2 is not an essential component of the image projection system 100, and the master projector 1m may oversee and control the image projection system 100.

In the embodiment described above, the transmissive liquid crystal light valves 22R, 22G, and 22B are used as the light modulators, and reflective light modulators, such as reflective liquid crystal light valves, may instead be used. Still instead, the light modulators may each, for example, be a digital mirror device that controls the direction in which incident light exits for each micromirror that serves as a pixel to modulate the light emitted from the light source 21. The configuration in which a plurality of light modulators are provided on a color light basis is not necessarily employed, and a configuration in which a single light modulator modulates a plurality of color light fluxes in a time division manner may instead be employed.

What is claimed is:

1. A projector comprising:
   a lens that projects a pattern image including a first pattern and a second pattern,
   wherein
   the first pattern is disposed along a first end of the pattern image, the first end overlaps with a second image projected by a first other projector, and the first pattern is a linear pattern,
   the second pattern includes a plurality of rectangular patterns, the plurality of rectangular patterns is disposed in a first area separated from the first pattern by a first distance, and is arranged in a direction parallel to the first end of the pattern image,
   the first distance corresponds to a width of a second area of the pattern image, the second area being an area overlapped with the second image,
   the plurality of rectangular patterns include a first rectangular pattern and a second rectangular pattern,
   a right edge of the first rectangular pattern is parallel to the first pattern, and
   an entire right edge of the second rectangular pattern overlaps an extension of the right edge of the first rectangular pattern.

2. The projector according to claim 1, further comprising:
   a processor that generates the pattern image and acquires information on the first distance,
   wherein the processor generates the pattern image based on the information.

3. The projector according to claim 2,
   wherein the processor disposes the rectangular patterns in a position separated from the first pattern of the pattern image by a distance longer than the first distance and based on the information.

4. The projector according to claim 1, further comprising:
   a processor that generates the pattern image and acquires information on a positional relationship between the pattern image and the second image,
   wherein the processor generates the pattern image based on the information.

5. An image projection system comprising:
   a first projector that projects a pattern image on a projection surface; and
   a second projector that projects a second image on the projection surface in such a way that part of the second image overlaps with the pattern image,
   wherein the first projector includes a lens that projects a pattern image including a first pattern and a second pattern,
   the first pattern is disposed along a first end of the pattern image, the first end overlaps with the second image, and the first pattern is a linear pattern,
   the second pattern includes a plurality of rectangular patterns, the plurality of rectangular patterns is disposed in a first area separated from the first pattern by a first distance, and is arranged in a direction parallel to the first end of the pattern image,
   the first distance corresponds to a width of a second area of the pattern image, and the second area is an area overlapped with the second image,
   the plurality of rectangular patterns include a first rectangular pattern and a second rectangular pattern,
   a right edge of the first rectangular pattern is parallel to the first pattern, and
   an entire right edge of the second rectangular pattern overlaps an extension of the right edge of the first rectangular pattern.

6. A method for controlling a projector, the method comprising:
   projecting, by the projector, a pattern image including a first pattern and a second pattern,
   wherein
   the first pattern is disposed along a first end of the pattern image, the first end overlaps with a second image projected by a first other projector, and the first pattern is a linear pattern,
   the second pattern includes a plurality of rectangular patterns, the plurality of rectangular patterns is disposed in a first area separated from the first pattern by a first distance, and is arranged in a direction parallel to the first end of the pattern image,
   the first distance corresponds to a width of a second area of the pattern image, and the second area is an area overlapped with the second image,
   the plurality of rectangular patterns include a first rectangular pattern and a second rectangular pattern,
   a right edge of the first rectangular pattern is parallel to the first pattern, and
   an entire right edge of the second rectangular pattern overlaps an extension of the right edge of the first rectangular pattern.

7. A method for generating a pattern image, the method comprising:
   generating a pattern image, projected by a first projector, including a first pattern and a second pattern,
   wherein
   the first pattern is disposed along a first end of the pattern image, the first pattern is a linear pattern,
   the second pattern includes a plurality of rectangular patterns, the plurality of rectangular patterns is in a first area separated from the first pattern by a first distance, and is arranged in a direction parallel to the first end of the pattern image,
   the first distance corresponds to a width of a second area of the pattern image, and the second area is an area overlapped with the second image projected by a first other projector,
   the plurality of rectangular patterns include a first rectangular pattern and a second rectangular pattern, a right edge of the first rectangular pattern is parallel to the first pattern, and
an entire right edge of the second rectangular pattern overlaps an extension of the right edge of the first rectangular pattern.

8. The projector according to claim 1,
wherein the rectangular pattern includes a first straight line section which is parallel to the first end of the pattern image, and a second straight line section which is perpendicular to the first end of the pattern image.

9. The projector according to claim 1, wherein
the pattern image includes a third pattern and a fourth pattern,
the third pattern is disposed along a second end of the pattern image, the second end overlaps with a third image projected by a second other projector, and the third pattern is linear pattern,
the fourth pattern includes a plurality of rectangular patterns, the plurality of rectangular patterns is disposed in a third area separated from the third pattern by a second distance, and is arranged in a direction parallel to the second end of the pattern image,
the second distance corresponds to a width of a fourth area of the pattern image, and
the fourth area is an area overlapped with the third image.

10. The method according to claim 6,
wherein the rectangular pattern includes a first straight line section which is parallel to the first end of the pattern image, and a second straight line section which is perpendicular to the first end of the pattern image.

11. The method according to claim 6, wherein
the pattern image includes a third pattern and a fourth pattern,
the third pattern is disposed along a second end of the pattern image, the second end overlaps with a third image projected by a second other projector, and the third pattern is linear pattern,
the fourth pattern includes a plurality of rectangular patterns, the plurality of rectangular patterns is disposed in a third area separated from the third pattern by a second distance, and is arranged in a direction parallel to the second end of the pattern image,
the second distance corresponds to a width of a fourth area of the pattern image, and
the fourth area is an area overlapped with the third image.

12. The method according to claim 7,
wherein the rectangular pattern includes a first straight line section, which is parallel to the first end of the pattern image, and a second straight line section, which is perpendicular to the first end of the pattern image.

13. The method according to claim 7, wherein
the pattern image including a third pattern and a fourth pattern,
the third pattern is disposed along a second end of the pattern image, the second end overlaps with a third image projected by a second other projector, and the third pattern is linear pattern,
the fourth pattern includes a plurality of rectangular patterns, the plurality of rectangular patterns is disposed in a third area separated from the third pattern by a second distance, and is arranged in a direction parallel to the second end of the pattern image,
the second distance corresponds to a width of a fourth area of the pattern image, and
the fourth area is an area overlapped with the third image.

\* \* \* \* \*